(12) United States Patent
Akkapeddi et al.

(10) Patent No.: US 12,149,624 B2
(45) Date of Patent: Nov. 19, 2024

(54) SYSTEM AND METHOD FOR PRE-AUTHENTICATING USER DEVICES WITHIN A METAVERSE

(71) Applicant: Bank of America Corporation, Charlotte, NC (US)

(72) Inventors: Naga Vamsi Krishna Akkapeddi, Charlotte, NC (US); Manu J. Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 333 days.

(21) Appl. No.: 17/929,353

(22) Filed: Sep. 2, 2022

(65) Prior Publication Data
US 2024/0080194 A1 Mar. 7, 2024

(51) Int. Cl.
*H04L 9/32* (2006.01)
*G06T 11/00* (2006.01)
*H04L 9/40* (2022.01)
*H04L 67/131* (2022.01)
*H04L 67/306* (2022.01)
*H04L 67/52* (2022.01)

(52) U.S. Cl.
CPC ............ *H04L 9/3213* (2013.01); *G06T 11/00* (2013.01); *H04L 63/102* (2013.01); *H04L 63/107* (2013.01); *H04L 67/131* (2022.05); *H04L 67/306* (2013.01); *H04L 67/52* (2022.05)

(58) Field of Classification Search
None
See application file for complete search history.

(56) References Cited

U.S. PATENT DOCUMENTS

| | | | |
|---|---|---|---|
| 7,046,647 B2 | 5/2006 | Oba et al. |
| 7,937,752 B2 | 5/2011 | Balfanz et al. |
| 8,281,011 B2 | 10/2012 | Jaudon et al. |
| 8,880,884 B2 | 11/2014 | Seibert et al. |
| 8,924,880 B2 | 12/2014 | Altberg et al. |
| 9,479,503 B2 | 10/2016 | Griffin et al. |
| 9,563,902 B2 | 2/2017 | Haswell et al. |
| 9,743,280 B2 | 8/2017 | Choyi et al. |
| 9,762,576 B2 | 9/2017 | Dispensa |
| 9,792,608 B2 | 10/2017 | Cox |
| 10,311,223 B2 | 6/2019 | Adams et al. |

(Continued)

*Primary Examiner* — Atta Khan

(57) ABSTRACT

A system for pre-authenticating a user device to navigate through virtual operation areas comprises a processor associated with a server. The processor accesses a virtual environment and receives an interaction request from the user device for an interaction session. The processor determines a set of virtual operation areas in a virtual environment based on the interaction request. The processor generates a corresponding meta-profile associated with a user profile by mapping each pre-authentication token associated with the user device from a corresponding physical location to a corresponding virtual operation area. The processor generates an avatar associated with the user device and associates the avatar to the meta-profile and a set of pre-authentication tokens for the avatar to access the virtual operation areas. The processor identifies a first pre-authentication token associated with the user device and a first level virtual operation area and dynamically grants a first level authentication to the avatar.

20 Claims, 4 Drawing Sheets

(56) References Cited

U.S. PATENT DOCUMENTS

| | | |
|---|---|---|
| 10,360,560 B2 | 7/2019 | Bryant |
| 10,586,229 B2 | 3/2020 | Hurry et al. |
| 10,691,202 B2 | 6/2020 | van Hoff et al. |
| 2014/0058812 A1* | 2/2014 | Bender .............. G06Q 30/0267 |
| | | 705/14.12 |
| 2017/0068961 A1 | 3/2017 | Cox |
| 2019/0295327 A1* | 9/2019 | An ........................ G06T 19/006 |
| 2019/0377417 A1* | 12/2019 | Friedman ............ H04L 63/0861 |
| 2020/0268462 A1 | 8/2020 | Popovic et al. |
| 2020/0351660 A1 | 11/2020 | Avetisov et al. |
| 2022/0078008 A1* | 3/2022 | Kong .................... G06F 21/645 |
| 2023/0216682 A1* | 7/2023 | Lipton .................... G06T 13/40 |
| | | 713/172 |
| 2023/0239150 A1* | 7/2023 | Cheng ................... H04L 9/3213 |
| | | 713/168 |
| 2023/0291740 A1* | 9/2023 | Ashby ................... H04L 63/083 |
| 2023/0376969 A1* | 11/2023 | Gillis ...................... G06F 3/011 |
| 2024/0070763 A1* | 2/2024 | Hopkins ............... G06V 20/20 |
| 2024/0232307 A1* | 7/2024 | Rai ......................... G06F 21/32 |
| 2024/0281052 A1* | 8/2024 | Le Chevalier .......... A63F 13/67 |

\* cited by examiner

SYSTEM AND METHOD FOR PRE-AUTHENTICATING USER DEVICES WITHIN A METAVERSE

TECHNICAL FIELD

The present disclosure relates generally to network communications and information security, and more specifically to a system and method for pre-authenticating user devices within a metaverse.

BACKGROUND

An organization entity may provide different services at different physical locations through different systems in a network. Existing systems generally require users to submit credentials each time to access the different physical locations and services in the network. User reauthentication in this context consumes valuable computer, memory, and network resources to transmit, store and verify the credentials.

SUMMARY

Conventional technology is not configured to allow user devices to navigate through virtual operation areas and perform interactions without reauthentication with entities at different physical locations associated with virtual locations in a virtual environment (e.g., such as a metaverse). The system described in the present disclosure is particularly integrated into a practical application of pre-authenticating a user device with an entity in a real-world environment to allow the user device to navigate through virtual operation areas without reauthentication in a virtual environment.

The disclosed system is configured to generate a set of pre-authentication tokens to register a user device with an entity for accessing a plurality of physical locations in a real-world environment. The set of pre-authentication tokens are stored in a user profile in a memory of a server. A pre-authentication token may represent a digital access key or a credential for the user device to access one or more physical locations associated with the entity. The disclosed system is configured to generate a meta-profile associated with the user profile to include the set of pre-authentication tokens. The disclosed system provides a virtual environment including a plurality of virtual operation areas which are associated with the corresponding physical locations in the real-world environment. The disclosed system is configured to obtain the pre-authentication tokens from the meta-profile to allow an avatar associated with the user device to access the corresponding virtual operational areas without reauthentication in the virtual environment.

In one embodiment, the system for pre-authenticating user devices that navigate through a plurality of virtual operation areas in a virtual environment without reauthentication comprises a processor and a memory. The memory is operable to store a user profile comprising a set of pre-authentication tokens. Each pre-authentication token is configured to authorize a user device associated with a user to perform an interaction with at least one entity associated with a plurality of physical locations in a real-world environment. The processor accesses a virtual environment which includes a plurality of virtual operation areas. Each virtual operation area is configured to provide a corresponding interaction associated with an entity associated with one or more physical locations in the real-world environment. The processor receives an interaction request from the user device for an interaction session in the virtual environment and determines a set of virtual operation areas in the virtual environment based on the interaction request. The processor generates a corresponding meta-profile associated with the user profile by mapping each pre-authentication token associated with the user device from the one or more corresponding physical locations to a corresponding virtual operation area. The processor generates an avatar associated with the user device to conduct the interaction session. The processor associates the avatar to the meta-profile which includes the set of pre-authentication tokens for the avatar to access the plurality of virtual operation areas. The processor identifies a first pre-authentication token which is associated with the user device and corresponds to a first level virtual operation area in the plurality of the virtual operation areas. The processor dynamically grants a first level authentication to the avatar to navigate into the first level virtual operation area.

The practical application may be implemented by the processor of the server for an avatar associated with a user device to preform interactions without the need to reauthenticate the user device in different virtual operation areas a virtual environment. For example, the system pre-authenticates a user device (e.g., augmented reality (AR)/virtual reality (VR) headset, mobile device, etc.) with an entity in a real-world environment to facilitate a more efficient navigation and operation of that user device in a corresponding virtual environment. The user device may be pre-authenticated for a particular user and a particular entity in the real world by checking credentials used by the use device for accessing the entity. The system generates a set of pre-authentication tokens that correspond to different virtual operational areas within the virtual environment. Each pre-authentication token may be established in advance of a virtual session so that when a user wants to enter a virtual operational area of the virtual environment, the pre-authentication token may be used to grant access to the virtual operational area without the need for rechecking credentials or reauthentication. For example, the first pre-authentication token may be used to grant access to a first virtual operational area. A second pre-authentication token may be used to grant access to a second virtual operational area, and so forth. The practical application may be implemented by the processor to perform corresponding interactions with the entity in the virtual operation areas in real time. This process conserves processing resources because the user device does not need to go through the authentication process each time it navigates to a different virtual operational area. Further, a particular advantage may be realized by creating a meta-profile that is associated with the pre-authenticated user device. The meta-profile stores all of the pre-authentication tokens created for the user device and the corresponding avatar to access the different virtual operational areas within the virtual environment.

These practical applications lead to the technical advantage of improving information security to the overall computer system since it allows an avatar associated with a registered user device to seamlessly navigate through virtual operation areas without the need for reauthentication. Since user reauthentication generally requires a user to submit credentials each time from one operation area to another operation area of the virtual environment, it consumes network bandwidth when transmitting the credentials. It also consumes additional memory space when storing the credentials in cache. Further, additional processor cycles are required to verify the credentials. Accordingly, the disclosed system conserves computer processing, memory utilization, and network resources by avoiding reauthentication. The disclosed system further improves user experiences and saves task processing time of the computer systems. Thus, the disclosed system improves computer system processing efficiency and the operations of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Previous technologies require reauthenticating user devices in different parts of a network or when performing different operations. This disclosure presents a system in which user devices do not need to be reauthenticated in different parts of a virtual network by referring to FIGS. 1 through 3A-3B.

Figure 1:
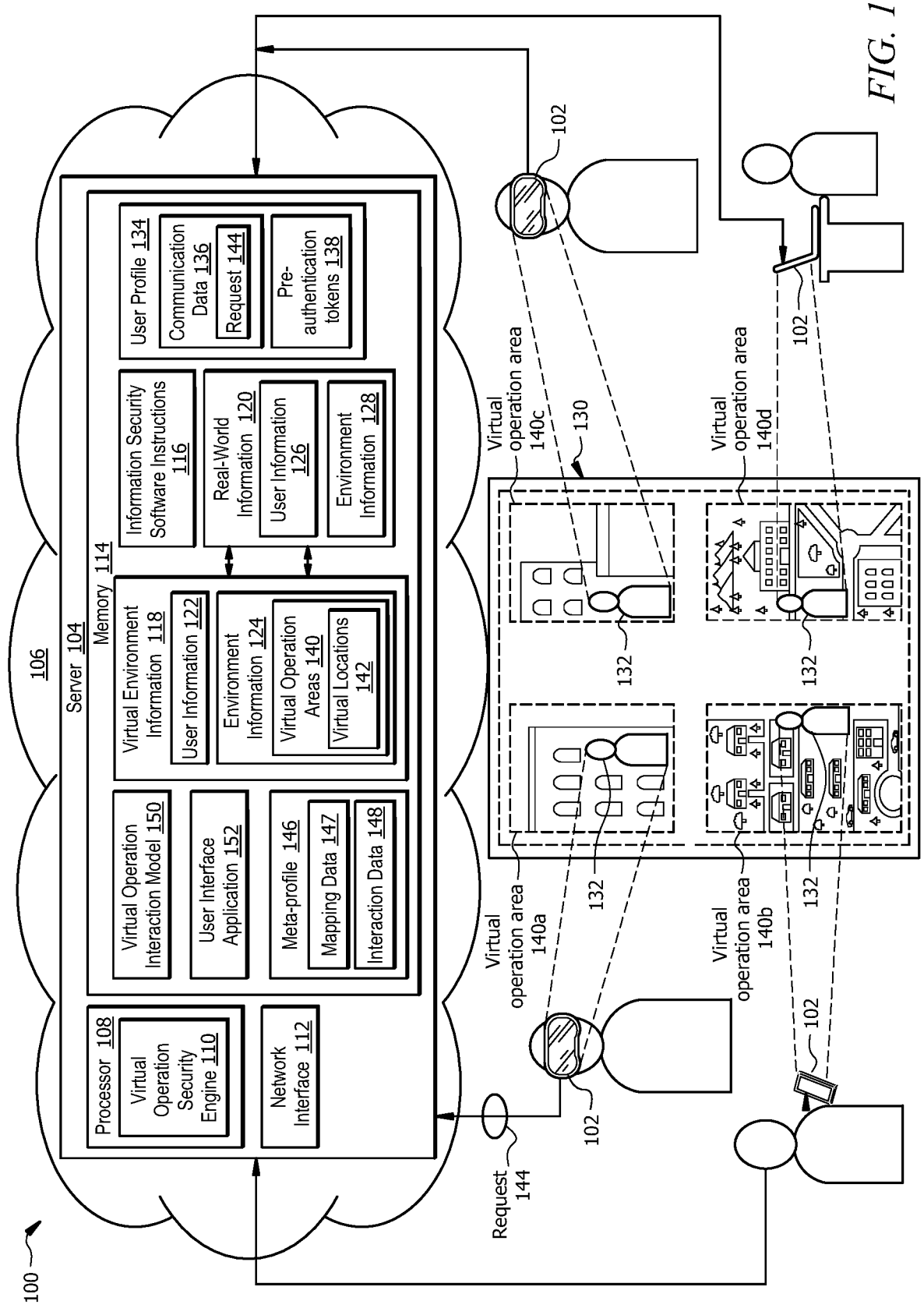
FIG. 1 illustrates an embodiment of a system configured to pre-authenticate a user device in a virtual environment.

Example System for Pre-Authenticating a User Device to Navigate Through Dynamic Virtual Operation Areas FIG. 1 illustrates one embodiment of a system 100 that is configured to pre-authenticate user devices 102 that navigate through a plurality of dynamic virtual operation areas 140 (e.g., 140a-140d) to perform interactions within a virtual environment 130. In one embodiment, system 100 comprises a server 104, one or more user devices 102, and a network 106. The system 100 may be communicatively coupled to the network 106 and may be operable to transmit data between each user device 102 and the server 104 through the network 106. Network 106 enables the communication between components of the system 100. Server 104 comprises a processor 108 in signal communication with a memory 114. Memory 114 stores information security software instructions 116 that when executed by the processor 108, cause the processor 108 to execute one or more functions described herein.

In some embodiments, the system 100 may be implemented by the server 104 to generate a set of pre-authentication tokens 138 to register a user device 102 with an organization entity for accessing a plurality of physical locations in the real-world environment. The server 104 may store a set of pre-authentication tokens 138 in a user profile 134 in the memory 114. The pre-authentication tokens 138 may be configured to grant access to a plurality of virtual operation areas 140 associated with the physical locations of the entity. The server 104 may create a meta-profile 146 associated with the user profile 134 and include the pre-authentication tokens 138. The server 104 may obtain the pre-authentication tokens 138 from the meta-profile 146 to allow an avatar 132 associated with the user device 102 to access the corresponding virtual operation areas 140 without reauthentication. The avatar 132 associated with the user device 102 may seamlessly navigate through the virtual operation areas 140 to complete an interaction session within a virtual environment 130.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Each user device 102 is further configured to allow a user to send an interaction request or request 144 for the user device 102 to access and navigate through virtual operation areas 140 in the virtual environment 130 to interact with the server 104. As another example, a user may use a user device 102 to send an interaction request 144 that requests a transfer of real-world resources and/or virtual resources between the user device 102 and the server 104. Example processes are described in more detail below in FIGS. 3A-3B.

Each user device 102 is configured to display a two-dimensional (2D) or three-dimensional (3D) representation of a virtual environment 130 to a user. Within the virtual environment 130, each user may be associated with a user device 102 and an avatar 132. An avatar 132 is a graphical representation of the user device 102 and the user within the virtual environment 130. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 130 to interact with an entity associated with the server 104 or other avatars 132 and objects within the virtual environment 130.

Figure 2:
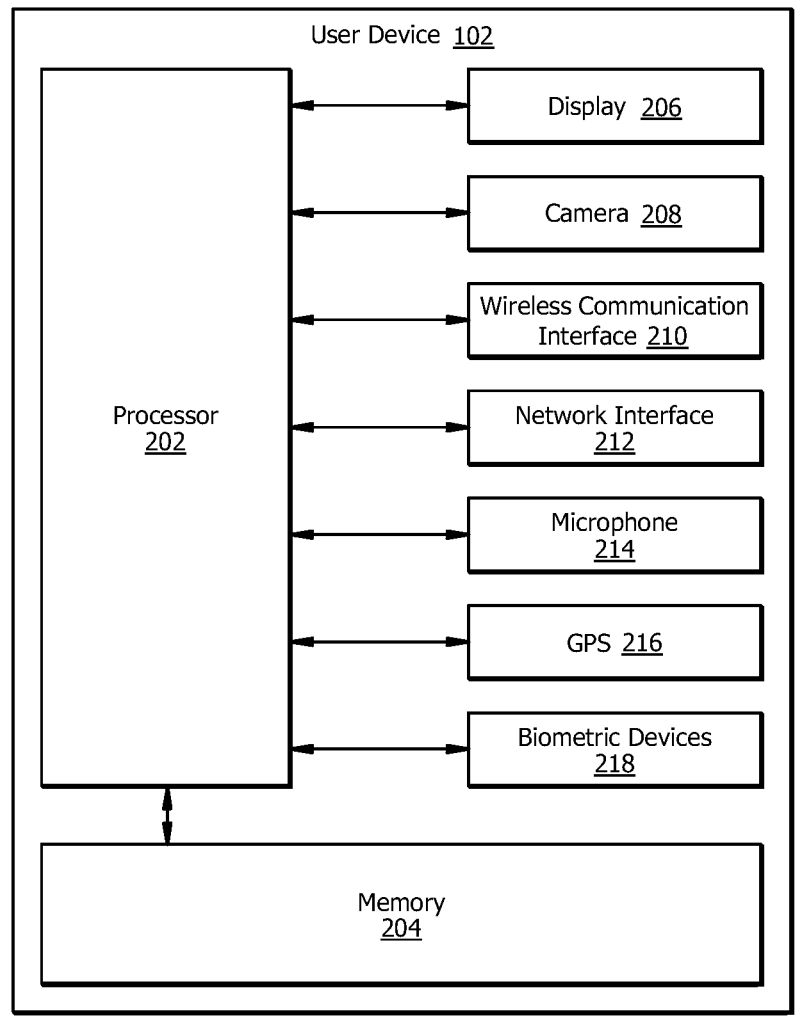
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the server 104. The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3A-3B. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices.

Figure 3A:
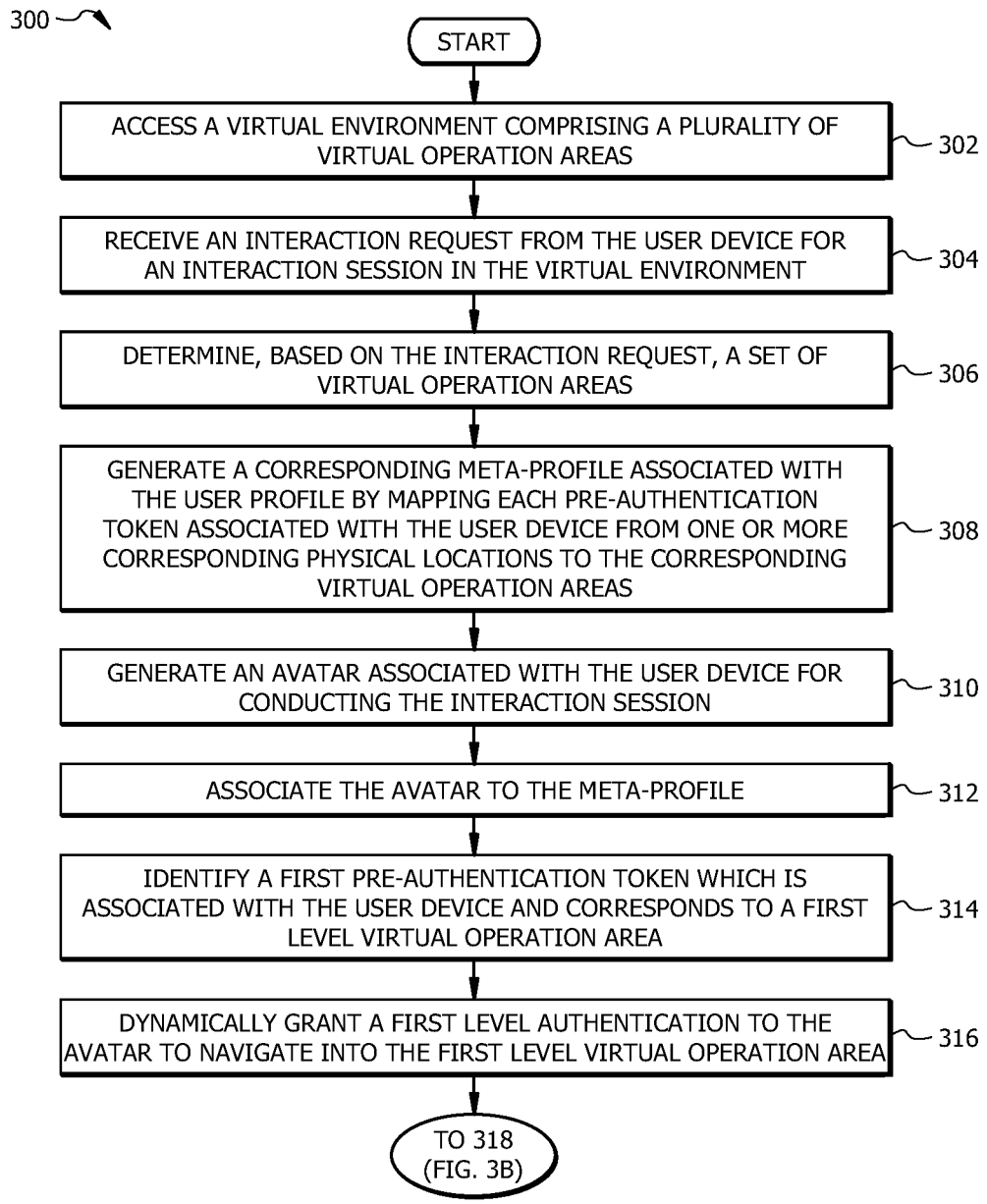
FIGS. 3A-3B illustrates an example operational flow of a method for pre-authenticating a user in the virtual environment.
Figure 3B:
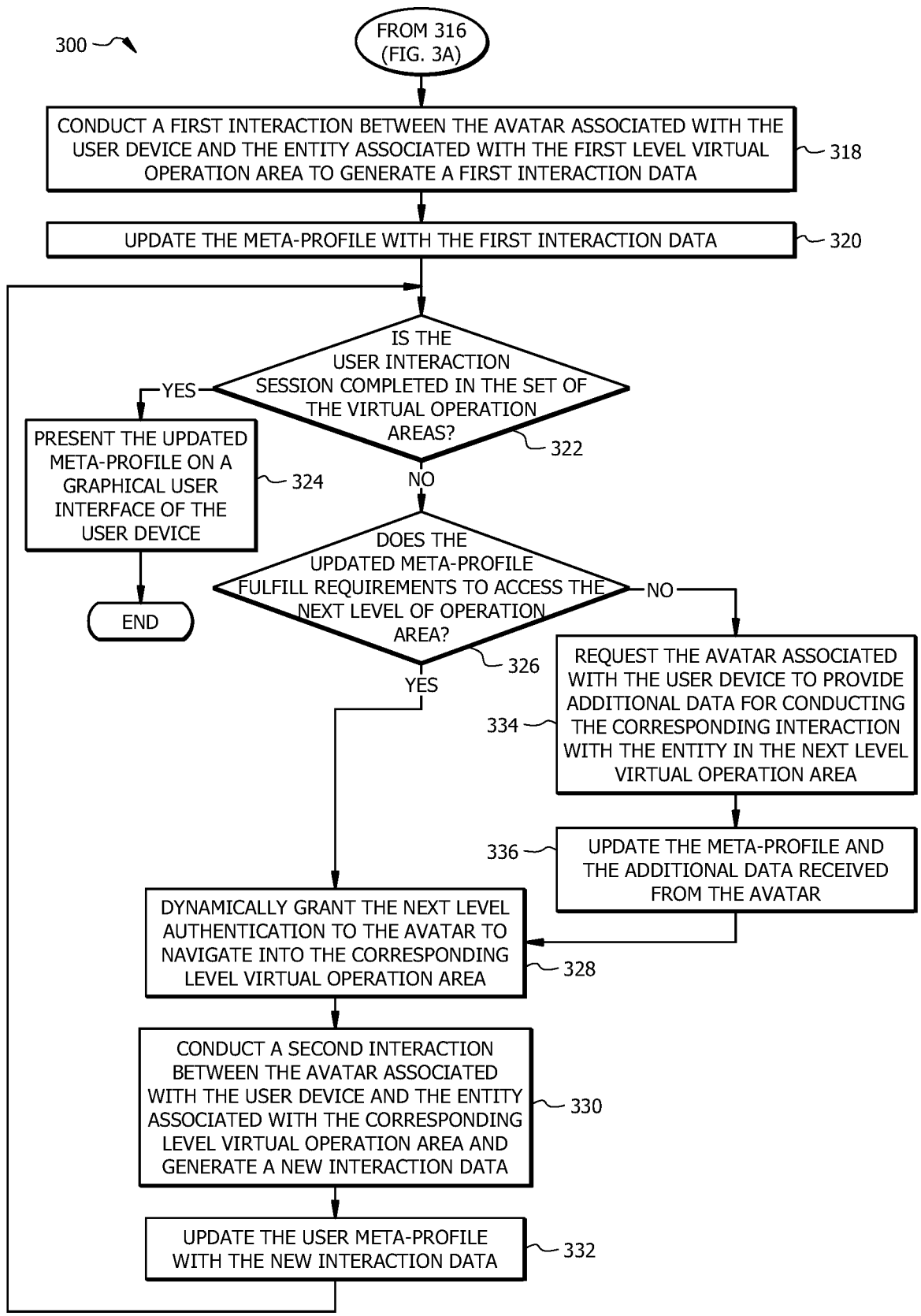

The memory 204 is operable to store any of the information described with respect to FIGS. 1 and 3A-3B along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution.

Display 206 is configured to present visual information to a user (for example, user in FIG. 1) in an augmented reality environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. Wireless communication interface 210 is configured to employ any suitable communication protocol.

The network interface 212 is configured to enable wired and/or wireless communications. The network interface 212 is configured to communicate data between the user device 102 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user, such as user, employing user device 102. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric devices 218 are configured to capture information about a person's physical characteristics and to output a biometric signal based on captured information. Biometric device 218 is communicably coupled to processor 202.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of the virtual operation security engine 110, as described further below in conjunction with the operational flows of the method 300 described in FIGS. 3A and 3B. In particular embodiments, the server 104 may be implemented in the cloud or may be organized in either a centralized or distributed manner.

Processor

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. The processor 108 may be a special-purpose computer designed to implement the functions disclosed herein.

In an embodiment, the virtual operation security engine 110 is implemented using logic units, FPGAs, ASICs, DSPs, or any other suitable hardware. The virtual operation security engine 110 is configured to operate as described in FIGS. 3A and 3B. The virtual operation security engine 110 may be configured to perform the operations of the method 300 as described in FIGS. 3A and 3B. For example, the virtual operation security engine 110 may be configured to provide multifactor authentication within a real-world environment and a virtual environment 130 for a user to access and interact with the entity in the virtual environment 130. As another example, the virtual operation security engine 110 may be configured to facilitate real-world resource and/or virtual resource transfers between users within a virtual environment 130.

The memory 114 stores any of the information described above with respect to FIGS. 1-2 and 3A-3B along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116, user profiles 134, meta-profile 146, virtual environment information 118, real-world information 120, avatars 132, virtual operation areas 140 including corresponding virtual locations 142, virtual environment 130, and/or any other data or instructions.

A user profile 134 includes a set of pre-authentication tokens 138, communication data 136 with interaction requests 144. A user profile 134 further includes one or more of user identifiers, username, physical address, email address, phone number, and any other data, such as documents, files, media items, etc. The plurality of user profiles may be stored by the processor 108 in the memory 114. The set of pre-authentication tokens 138 are associated with a user device 102 and are configured to register the user device 102 with an entity to access a plurality of physical locations in a real-world environment. The pre-authentication tokens 138 are configured to provide multiple levels of pre-authentication for the user device 102 in a real-world environment and an avatar 132 associated with the user device 102 to navigate in a virtual environment 130 without reauthentication. The meta-profile 146 includes interaction data 148 and mapping data 147 configured to associate corresponding pre-authentication tokens 138 to the user device 102 and the associated avatar 132. The information security software instructions 116 may comprise any suitable set of instructions, logic, rules, or code operable to execute the virtual operation security engine 110. In an example operation, the memory may store a virtual operation interaction model 150, a user interface application 152, and other program models which executed by the processor 108 to implement operational flows of the system of FIG. 1.

The virtual environment information 118 comprises user information 122 and environment information 124. The user information 122 generally comprises information that is associated with any user profiles associated with user accounts that can be used within a virtual environment 130. The environment information 124 includes data of virtual operation areas 140a-140d and corresponding virtual locations 142. For example, user information 122 may comprise user profile information, online account information, digital assets information, or any other suitable type of information that is associated with a user within a virtual environment 130. The environment information 124 generally comprises information about the appearance of a virtual environment 130. For example, the environment information 124 may comprise information associated with objects, landmarks, buildings, structures, avatars 132, virtual operation areas 140, or any other suitable type of element that is present within a virtual environment 130. In some embodiments, the environment information 124 may be used to create a representation of a virtual environment 130 for users. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environment 130 may be configured to use gravity whereas other virtual environment 130 may not be configured to use gravity.

The real-world information 120 comprises user information 126 and environment information 128. The user information 126 generally comprises information that is associated with user profiles and user accounts that can be used within the real world. For example, user information 126 may comprise user profile information, account information, or any other suitable type of information that is associated with a user within a real-world environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with an entity. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. The server 104 may be configured to store one or more maps that translate or convert different types of interactions between the real world environment 120 and the virtual environment 130 and vice-versa.

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Virtual Operation Security Engine

Virtual operation security engine 110 may include, but is not limited to, one or more separate and independent software and/or hardware components of a server 104. In some embodiment, the virtual operation security engine 110 may be implemented by the processor 108 by executing the information security software instructions 116 to create a virtual environment 130 and generate a plurality of virtual operation areas 140*a*-140*d* in the virtual environment 130. In some embodiments, the virtual operation security engine 110 may be implemented by the processor 108 by executing the user interface application 152 and the virtual operation interaction model 150 to process communication data 136 including a user request 144 from a user device 102 and generate an avatar 132 associated with the user device 102. The virtual operation security engine 110 may be implemented by the processor 108 by executing the user interface application 152 and the virtual operation interaction model 150 to dynamically grant the avatar 132 an authentication without reauthentication while the avatar 132 associated with the user device 102 navigates through and interacts with a plurality of virtual operation areas 140 associated with the entity through the server 104. The operation of the disclosed system 100 is described below.

Generating a Plurality of Virtual Operation Areas

The server 104 may generate a virtual environment 130 based on the virtual environment information 118 and the real-world information 120. FIG. 1 illustrates an example of a plurality of virtual operation areas 140 within a virtual environment 130. In some embodiments, the virtual environment 130 comprises a plurality of associated virtual operation areas 140 (e.g., 140*a*-140*d*). The virtual operation areas 140 are associated with an entity and corresponding physical locations in a real-world environment. In one embodiment, the virtual operation areas 140 may be configured and executed by the processor 108 to provide one or more services provided by the same or different entities or sub-entities at different physical locations in the real-world environment. The server 104 may be configured to store one or more maps executed by the processor 108 that translate or convert different types of interactions occurred in the virtual operation areas 140 between the real world and the virtual environment 130 and vice-versa.

Generating an Avatar for Entering Virtual Operation Areas in a Virtual Environment Within the virtual environment 130, an avatar 132 is generated by the processor 108 as a graphical representation of a user device 102 within the virtual environment 130. The avatar 132 is associated with the corresponding a meta-profile 146 associated with user profile 134. The avatar 132 includes a plurality of features and characteristics which are processed by the processor 108 to present the avatar 132 as the graphical representation of a user device 102 in the virtual environment 130.

For example, the server 104 may receive a signal indicating a physical location of the user device 102 and/or detect the user device 102 in the real-world environment. The server 104 may store the received signal in the memory 114. The server 104 may determine a virtual location of the avatar 132 associated with the user device 102 in the virtual environment 130 based on the physical location of the user device 102. The server 104 may obtain the environment information 124 and environment information 128 associated with the virtual location and physical location of the user device 102. The server 104 may generate and present an avatar 132 in the virtual environment 130 based on the user profile 134, the obtained environment information 124 and environment information 128. By using the user device 102, the avatar 132 can move or maneuver and interact with different entities, other avatars, and objects within the virtual environment 130. For example, the objects may be associated with fillable forms or documents, questions required for completing a task through the virtual operation areas 140, etc.

Pre-Authenticating a User Device to Conduct Interactions in a Virtual Environment This process may be implemented by the server 104 to generate a set of the pre-authentication tokens 138 to register the user device 102 with the entity for accessing a plurality of physical locations in the real-world environment. Each authentication token 138 may represent an access key or access credential for authorizing the user device 102 to access the entity and conduct certain interactions in one or more physical locations in the real-world environment. The server 104 may store each authentication token 138 in the user profile 134.

In some embodiments, the server 104 may generate a meta-profile 146 associated with the user profile 134. The meta-profile 146 includes the set of pre-authentication tokens to authorize the avatar 132 associated with the user device 102 to access the plurality of virtual operation areas 140. For example, the meta-profile may include mapping data 147 which is configured to map each pre-authentication token 138 associated with the user device 102 from the one or more corresponding physical locations to the corresponding virtual operation areas 140. The server 104 may associate each authentication token 138 to an avatar 132. Each pre-authentication token 138 in the meta-profile 146 may be configured to allow the avatar 132 to access a particular virtual operation area 140 without reauthentication.

For example, in response to receiving an interaction request 144 from the user device 102 for an interaction session in the virtual environment 130, the server 104 may determine a set of virtual operation areas 140 in the virtual environment. A interaction session may include one or more interactions between an avatar 132 associated with the user device 102 and an entity. The server 104 may access the meta-profile 146 to identify and obtain the corresponding pre-authentication tokens 138 associated with the user device 102. The corresponding pre-authentication tokens 138 may allow the avatar 132 to navigate through corresponding virtual operation areas 140 without reauthentication. The avatar 132 may conduct certain authorized interactions provided by the entity associated with the virtual operation areas 140. The server 104 may use a first pre-authentication token 138[1] to dynamically grant a first level authentication to the avatar 132 to navigate into the first virtual operation area 140a and conduct the first interaction with the entity. The server 104 may use a second pre-authentication token 138[2] to dynamically grant a second level authentication to the avatar 132 to navigate into the second virtual operation area 140b and conduct the second interaction with the entity.

In this way, the server 104 uses the set of the authentication tokens 138 associated with the registered user device to dynamically authorize the avatar 132 seamlessly navigate through corresponding virtual operation areas 140 to conduct corresponding interactions with an entity and complete the user interaction session.

In some embodiments, the server 104 may generate the set of pre-authentication tokens 138 by implementing at least one operation associated with a block chain, a non-fungible token (NFT), or a secure application programming interface (API). Each pre-authentication token is represented by at least one of an alphanumeric value, a cryptocurrency, or an authentication string.

Example Operational Flow for Navigating Through Virtual Operation Areas without Reauthentication FIGS. 3A-3B provide an example operational flow of a method 300 of navigating through dynamic virtual operation areas and performing interactions without reauthentication in the virtual environment. Modifications, additions, or omissions may be made to method 300. Method 300 may include more, fewer, or other operations. For example, operations may be performed by the server 104 in parallel or in any suitable order. One or more operations of method 300 may be implemented, at least in part, in the form of the information security software instructions 116 of FIG. 1, stored on non-transitory, tangible, machine-readable media (e.g., memory 114 of FIG. 1) that when executed by one or more processors (e.g., processor 108 of FIG. 1) may cause the one or more processors to perform operations 302-336.

The method 300 begins at operation 302 where the server 104 access a virtual environment 130 comprising a plurality of virtual operation areas. Each virtual operation area 140 is configured to provide a corresponding interaction associated with an entity associated with one or more physical locations in the real-world environment.

At operation 304, the server 104 receives incoming communication data 136 with an interaction request 144 from the user device 102 for establishing an interaction session between an avatar 132 and a virtual operation area 140 through the server 104 via the network 106. In one embodiment, the server 104 may receive incoming communication data 136 from an avatar 132 through a user device 102. The communication data 136 may include an interaction request 144 to establish an interaction session with the entity for completing a task. The task may be determined by the server 104 to perform the plurality of interactions in the corresponding virtual operation areas 140 based on the received communication data 136 and the user profile 134.

At operation 306, the server 104 determines a set of virtual operation areas 140 for implementing the interaction session in the virtual environment 130 based on the interaction request. The set of virtual operation areas 140 may be configured to provide corresponding interactions of the interaction session with an entity.

At operation 308, the server 104 generates a corresponding meta-profile 146 associated with the user profile 134 by mapping each pre-authentication token 138 associated with the user device 102 from the one or more corresponding physical locations to the corresponding virtual operation areas 140.

At operation 310, the server 104 generates an avatar 132 associated with the user device to conduct the interaction session in the set of virtual operation areas 140 in the virtual environment 130.

At operation 312, the server 104 associates the avatar 132 to the meta-profile 146. The server 104 may access the meta-profile 146 to retrieve the set of the pre-authentication tokens 138 to dynamically authorize the avatar 132 associated with the user device 102 to seamlessly access and maneuver through the set of virtual operation areas 140 without reauthentication. The pre-authentication tokens 138 may be configured to provide the user device 102 with different levels of pre-authentication. Each level of pre-authentication requires a corresponding pre-authentication tokens 138 which corresponds to a corresponding level virtual operation area 140.

At operation 314, the server 104 identifies a first pre-authentication token 138 which is associated with the user device 102 and corresponds to a first level virtual operation area 140a in the set of the virtual operation areas 140. In some embodiments, the server 104 detects the avatar 132 entering a first virtual operation area 140a in the virtual environment 130. The server 104 may receive a signal indicating a physical location of the user device 102 and detect the user device 102 moving in the real-world environment. The server 104 stores the received signal in the memory 114 and determines a virtual location 142 of the avatar 132 moving with the user device 102 in the virtual environment 130 based on the physical location of the user device 102. In one embodiment, the server 104 may receive a signal from the user device 102 and detect the avatar 132 moving and entering a virtual operation area 140 in the virtual environment 130.

At operation 316, the server 104 dynamically grants a first level authentication to the avatar 132 to navigate into the first level virtual operation area 140a based on the first pre-authentication token 138.

At operation 318, the server 104 conducts a first interaction between the avatar 132 associated with the user device 102 and the entity associated with the first level virtual operation area 140a and generates a first interaction data 148.

At operation 320, the server 104 updates interaction data 148 of the meta-profile 146 with the first interaction data 148.

At operation 322, the server 104 determines whether the user interaction session is completed in the set of the virtual operation areas 140 based on the interaction data 148 stored in the updated meta-profile 146.

At operation 324, the server 104 presents the updated meta-profile on a graphical user interface of the user device 102 in response to determining that the interaction session is complete.

At operation 326, the server 104 determines whether the updated meta-profile 146 fulfills interaction requirements to interact with the entity at a second level of virtual operation area 140 in response to determining that the interaction session is not complete.

At operation 328, the server 104 dynamically grants a second level authentication to the avatar 132 to navigate into the second level virtual operation area 140. The server 104 may access the mapping data 147 of the metal-profile 146 associated with user profile 134 to identify and obtain a second pre-authentication token 138 which is associated with the user device 102 and corresponds to a second level virtual operation area 140 in the set of the virtual operation areas. At operation 334, the server 104 requests the avatar 132 associated with the user device 102 to provide additional data for conducting the second interaction with the entity in the second level virtual operation area 140 in response to determining that the meta-profile 146 does not fulfill the interaction requirements to interact with the entity at the second level of operation area. At operation 336, the server 104 updates the meta-profile 146 with the additional data received from the avatar 132 associated with the user device 102.

At operation 330, the server 104 conducts the second interaction between the avatar 132 associated with the user device 102 and the entity associated with the second level virtual operation area and generates a second interaction data 148 based on the updated meta-profile 146.

At operation 332, the server 104 updates the user meta-profile 146 with the second interaction data 148.

The server 104 may conduct the iteration operations 322 and 326-336 until the interaction session is complete in the set of the virtual operation areas 140. During this process, the server 104 may access the metal-profile 146 to identify and obtain a corresponding pre-authentication token 138 which is associated with the user device 102 and corresponds to a next level virtual operation area 140 in the set of the virtual operation areas 140.

In some embodiment, the server 104 identifies the set of the virtual operation areas 140 based on the communication data 136 received from the user device 102. The communication data 136 is indicative of a task to be completed during the interaction session. In one embodiment, the interaction session may include corresponding interactions with certain levels of dependencies between each other. The server 104 may instruct the avatar 132 to access the set of the virtual operation areas 140 in a particular order based on the dependencies of respective interactions of the interaction session in the corresponding virtual operation areas 140. For example, one interaction to be performed may depend on whether another interaction is complete based on the task. In one embodiment, the server 104 may allow the avatar 132 to choose to access the set of the virtual operation areas 140 respectively to perform the corresponding interactions for complete the interaction session. In this case, one interaction may not depend on whether another interaction is complete.

In some embodiments, software instructions 116 associated with the operational flows and other described processes may be deployed into a practical application executed by the server 104 to implement any operations in the virtual operation areas 140. The practical application may be implemented by the processor 108 to receive and process communication data 136 from user device 102, generate an avatar 132 associated with the user device 102, and detect the avatar 132 entering a virtual operation areas in a virtual environment 130. The practical application may be implemented by the processor 108 to access the mega-profile 146 to obtain the corresponding pre-authentication tokens 138 associated with the registered user device 102 and the avatar 132. The processor 108 may use the pre-authentication tokens 138 to authorize the avatar 132 to seamlessly navigate without reauthentication and perform interactions in the corresponding virtual operation areas 140 in the virtual environment 130. The avatar 132 may seamlessly navigate through the virtual operation areas 140 without reauthentication to complete a task predefined by the server 104 based on the communication data 136 via the network in real time.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
  a memory operable to store:
    a user profile comprising a set of pre-authentication tokens, wherein each pre-authentication token is configured to authorize a user device associated with a user to perform an interaction with at least one entity associated with a plurality of physical locations in a real-world environment; and
  a processor operably coupled to the memory, the processor configured to:
    access a virtual environment comprising a plurality of virtual operation areas, wherein each virtual operation area is configured to provide a corresponding interaction associated with an entity associated with one or more physical locations in the real-world environment;
    receive an interaction request from the user device for an interaction session in the virtual environment;
    determine, based on the interaction request, a set of virtual operation areas in the virtual environment;
    generate a corresponding meta-profile associated with the user profile by mapping each pre-authentication token associated with the user device from the one or more corresponding physical locations to the corresponding virtual operation areas;
    generate an avatar associated with the user device to conduct the interaction session;

associate the avatar to the meta-profile, the meta-profile comprising the set of pre-authentication tokens for the avatar to access the set of virtual operation areas;

identify a first pre-authentication token which is associated with the user device and corresponds to a first level virtual operation area in the set of the virtual operation areas; and dynamically grant a first level authentication to the avatar to navigate into the first level virtual operation area.

2. The system of claim 1, wherein the processor is further configured to:

generate the set of the pre-authentication tokens to provide the user device with different levels of pre-authentication corresponding to dependencies between the corresponding interactions provided by the entity at the plurality of the physical locations in the real-world environment, wherein the set of the pre-authentication tokens are generated by implementing at least one operation associated with a block chain, a non-fungible token (NFT), or a secure application programming interface (API);

register the user device for performing the corresponding interactions with the entity in the real-world environment with the set of the pre-authentication tokens; and in response to receiving the interaction request, associate the set of the pre-authentication tokens with the user device and the entity from the plurality of the physical locations in the real-world environment to the corresponding virtual operation areas in the virtual environment.

3. The system of claim 1, wherein the processor is further configured to:

conduct a first interaction between the avatar associated with the user device and the entity associated with the first level virtual operation area and generate a first interaction data;

update the meta-profile with the first interaction data;

determine, based on the updated meta-profile, whether the user interaction session is completed in the set of the virtual operation areas;

in response to determining that the interaction session is complete, present the updated meta-profile on a graphical user interface of the user device; and in response to determining that the interaction session is not complete, determine whether the updated meta-profile fulfills interaction requirements to interact with the entity at a second level of operation area.

4. The system of claim 3, wherein the processor is further configured to:

in response to determining that the meta-profile fulfills the interaction requirements to interact with the entity at the second level of operation area, dynamically grant a second level authentication to the avatar to navigate into the second level virtual operation area;

in response to determining that the user meta-profile does not fulfill the interaction requirements to interact with the entity at the second level of operation area, request the avatar associated with the user device to provide additional data for conducting the second interaction with the entity in the second level virtual operation area; and update the meta-profile with the additional data received from the avatar.

5. The system of claim 4, wherein the processor is further configured to:

conduct, based on updated meta-profile, the second interaction between the avatar associated with the user device and the entity associated with the second level virtual operation area and generate a second interaction data; and update the user meta-profile with the second interaction data.

6. The system of claim 1, wherein each pre-authentication token is represented by at least one of an alphanumeric value, a cryptocurrency, or an authentication string.

7. The system of claim 1, wherein the processor is further configured to:

receive a signal indicating a physical location of the user device in the real-world environment;

store the received signal in the memory; and determine a virtual location of the avatar associated with the user device in the corresponding virtual operation area in the virtual environment based on the physical location of the user device and one or more physical locations associated with the entity operated in the real-world environment.

8. A method comprising:

accessing a virtual environment comprising a plurality of virtual operation areas, wherein each virtual operation area is configured to provide a corresponding interaction associated with an entity associated with one or more physical locations in the real-world environment;

receiving an interaction request from a user device for an interaction session in the virtual environment;

determining, based on the interaction request, a set of virtual operation areas in the virtual environment;

generating a corresponding meta-profile associated with the user profile by mapping each pre-authentication token associated with the user device from the one or more corresponding physical locations to the corresponding virtual operation areas;

generating an avatar associated with the user device to conduct the interaction session;

associating the avatar to the meta-profile, the meta-profile comprising the set of pre-authentication tokens for the avatar to access the set of virtual operation areas;

identifying a first pre-authentication token which is associated with the user device and corresponds to a first level virtual operation area in the set of the virtual operation areas; and dynamically granting a first level authentication to the avatar to navigate into the first level virtual operation area.

9. The method of claim 8, further comprising:

generating the set of the pre-authentication tokens to provide the user device with different levels of pre-authentication corresponding to dependencies between the corresponding interactions provided by the entity at the plurality of the physical locations in the real-world environment, wherein the set of the pre-authentication tokens are generated by implementing at least one operation associated with a block chain, a non-fungible token (NFT), or a secure application programming interface (API);

registering the user device for performing the corresponding interactions with the entity in the real-world environment with the set of the pre-authentication tokens; and in response to receiving the interaction request, associating the set of the pre-authentication tokens with the user device and the entity from the plurality of the physical locations in the real-world environment to the corresponding virtual operation areas in the virtual environment.

10. The method of claim 8, further comprising:
conducting a first interaction between the avatar associated with the user device and the entity associated with the first level virtual operation area and generate a first interaction data;
updating the meta-profile with the first interaction data;
determining, based on the updated meta-profile, whether the user interaction session is completed in the set of the virtual operation areas;
in response to determining that the interaction session is complete, presenting the updated meta-profile on a graphical user interface of the user device; and
in response to determining that the interaction session is not complete, determining whether the updated meta-profile fulfills interaction requirements to interact with the entity at a second level of operation area.

11. The method of claim 10, further comprising:
in response to determining that the meta-profile fulfills the interaction requirements to interact with the entity at the second level of operation area, dynamically granting a second level authentication to the avatar to navigate into the second level virtual operation area;
in response to determining that the user meta-profile does not fulfill the interaction requirements to interact with the entity at the second level of operation area, requesting the avatar associated with the user device to provide additional data for conducting the second interaction with the entity in the second level virtual operation area; and
updating the meta-profile with the additional data received from the avatar.

12. The method of claim 11, further comprising:
conducting, based on updated meta-profile, the second interaction between the avatar associated with the user device and the entity associated with the second level virtual operation area and generate a second interaction data; and
updating the user meta-profile with the second interaction data.

13. The method of claim 8, wherein each pre-authentication token is represented by at least one of an alphanumeric value, a cryptocurrency, or an authentication string.

14. The method of claim 8, further comprising:
receiving a signal indicating a physical location of the user device in the real-world environment;
storing the received signal in the memory; and
determining a virtual location of the avatar associated with the user device in the corresponding virtual operation area in the virtual environment based on the physical location of the user device and one or more physical locations associated with the entity operated in the real-world environment.

15. A non-transitory computer-readable medium that stores instructions that when executed by a processor, causes the processor to:
access a virtual environment comprising a plurality of virtual operation areas, wherein each virtual operation area is configured to provide a corresponding interaction associated with an entity associated with one or more physical locations in the real-world environment;
receive an interaction request from a user device for an interaction session in the virtual environment;
determine, based on the interaction request, a set of virtual operation areas in the virtual environment;
generate a corresponding meta-profile associated with the user profile by mapping each pre-authentication token associated with the user device from the one or more corresponding physical locations to the corresponding virtual operation areas;
generate an avatar associated with the user device to conduct the interaction session;
associate the avatar to the meta-profile, the meta-profile comprising a set of pre-authentication tokens for the avatar to access the set of virtual operation areas;
identify a first pre-authentication token which is associated with the user device and corresponds to a first level virtual operation area in the set of the virtual operation areas; and
dynamically grant a first level authentication to the avatar to navigate into the first level virtual operation area.

16. The non-transitory computer-readable medium of claim 15, wherein the instructions when executed by the processor further cause the processor to:
generate the set of the pre-authentication tokens to provide the user device with different levels of pre-authentication corresponding to dependencies between the corresponding interactions provided by the entity at the plurality of the physical locations in the real-world environment, wherein the set of the pre-authentication tokens are generated by implementing at least one operation associated with a block chain, a non-fungible token (NFT), or a secure application programming interface (API), wherein each pre-authentication token is represented by at least one of an alphanumeric value, a cryptocurrency, or an authentication string;
register the user device for performing the corresponding interactions with the entity in the real-world environment with the set of the pre-authentication tokens; and
in response to receiving the interaction request, associate the set of the pre-authentication tokens with the user device and the entity from the plurality of the physical locations in the real-world environment to the corresponding virtual operation areas in the virtual environment.

17. The non-transitory computer-readable medium of claim 15, wherein the instructions when executed by the processor further cause the processor to:
conduct a first interaction between the avatar associated with the user device and the entity associated with the first level virtual operation area and generate a first interaction data;
update the meta-profile with the first interaction data;
determine, based on the updated meta-profile, whether the user interaction session is completed in the set of the virtual operation areas;
in response to determining that the interaction session is complete, present the updated meta-profile on a graphical user interface of the user device; and
in response to determining that the interaction session is not complete, determine whether the updated meta-profile fulfills interaction requirements to interact with the entity at a second level of operation area.

18. The non-transitory computer-readable medium of claim 17, wherein the instructions when executed by the processor further cause the processor to:
in response to determining that the meta-profile fulfills the interaction requirements to interact with the entity at the second level of operation area, dynamically grant a second level authentication to the avatar to navigate into the second level virtual operation area;

in response to determining that the user meta-profile does not fulfill the interaction requirements to interact with the entity at the second level of operation area, request the avatar associated with the user device to provide additional data for conducting the second interaction with the entity in the second level virtual operation area; and update the meta-profile with the additional data received from the avatar.

19. The non-transitory computer-readable medium of claim 18, wherein the instructions when executed by the processor further cause the processor to:

conduct, based on updated meta-profile, the second interaction between the avatar associated with the user device and the entity associated with the second level virtual operation area and generate a second interaction data; and update the user meta-profile with the second interaction data.

20. The non-transitory computer-readable medium of claim 15, wherein the instructions when executed by the processor further cause the processor to:

receive a signal indicating a physical location of the user device in the real-world environment;

store the received signal in the memory; and determine a virtual location of the avatar associated with the user device in the corresponding virtual operation area in the virtual environment based on the physical location of the user device and one or more physical locations associated with the entity operated in the real-world environment.

* * * * *